(12) United States Patent
Heckmann

(10) Patent No.: US 6,238,011 B1
(45) Date of Patent: May 29, 2001

(54) METHOD AND DEVICE FOR CONTROLLING A WHEEL BRAKE

(75) Inventor: Hans Heckmann, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/327,121

(22) Filed: Jun. 7, 1999

(30) Foreign Application Priority Data

Jun. 12, 1998 (DE) ............................................. 198 26 053

(51) Int. Cl.$^7$ ............................. B60L 7/00; F16D 71/00; F16D 66/00; F16D 65/38
(52) U.S. Cl. ............................................. 303/20; 188/71.7
(58) Field of Search .................................. 303/167, 168, 303/3, 15, 166, 112, 176, 20; 188/161, 162, 157, 196 R, 71.7, 71.8

(56) References Cited

U.S. PATENT DOCUMENTS

| 5,522,269 | * | 6/1996 | Takeda et al. | ................... | 73/862.333 |
| 5,549,371 | * | 8/1996 | Konaga et al. | ........................ | 303/152 |
| 6,000,507 | * | 12/1999 | Bohm et al. | ........................... | 188/158 |
| 6,003,640 | * | 12/1999 | Ralea | ...................................... | 188/71.5 |
| 6,008,604 | * | 12/1999 | Maisch | .................................. | 318/362 |
| 6,015,194 | * | 1/2000 | Decker | .................................. | 303/155 |
| 6,059,379 | * | 5/2000 | Deml et al. | ............................. | 303/15 |

FOREIGN PATENT DOCUMENTS

| 195 26 645 | | 1/1997 | (DE) . |
| 0795463 | * | 9/1997 | (EP) . |
| 2305988 | * | 4/1997 | (GB) . |
| 94/24453 | | 10/1994 | (WO) . |

* cited by examiner

Primary Examiner—Robert J. Oberleitner
Assistant Examiner—Melody M. Burch
(74) Attorney, Agent, or Firm—Kenyon & Kenyon

(57) ABSTRACT

A method and a device for controlling a wheel brake in open-loop, which is provided with an electrically controllable control device. The control, in particular the clearance adjustment, is effected as a function of the change tendency of a braking-force or braking-torque signal over a path signal which represents a measure for the path covered by the brake pad.

12 Claims, 3 Drawing Sheets

METHOD AND DEVICE FOR CONTROLLING A WHEEL BRAKE

FIELD OF THE INVENTION

The present invention relates to a method and a device for controlling a wheel brake in open loop.

BACKGROUND INFORMATION

When controlling a wheel brake, in some applications, it is important to know when the brake pads (or linings) lift off from the brake disc or drum. This holds true, for example, in connection with the adjustment of the clearance (air gap). Another application can be seen in the control of the wheel brake when the brake releases, it being possible to ensure that the vehicle wheel brakes are released essentially simultaneously. In the following, the problem of adjusting the clearance is discussed as the preferred field of application.

The adjustment of the clearance at a wheel brake is desirable with a view to the continually existing wear and tear of the brake pad, as well as changes in the marginal conditions such as the brake temperature. This holds true in particular for motor-vehicle wheel-brake systems operated using electric motors, in which the wheel brakes are controlled by driving brake actuators having electric motors. Motor-vehicle wheel brakes operated by electric motors are known, for example, from PCT Publication No. 94/24453 or German Published Patent Application No. 19 526 645, where the application force is produced by an electric motor. In an electrically controlled braking system, a required clearance (distance between the brake pad and the brake disc) should be maintained in all working points in the unbraked state. For example, in the event of a lateral runout of the brake disc, a clearance which is too small leads to friction losses between the brake disc and the brake pad even in the unbraked state. If there is no compensation for the continually existing wear and tear of the brake pad, then a clearance which is too large will occur. This will result in a reduction of the dynamic response of the braking process, since after initiating the braking process, the electric motor would first of all have to run through the clearance before any braking action would come about at the brake disc. In addition, the goal should be for the clearance to be adjusted approximately equally at both wheels of a vehicle axle. A different clearance leads to a different response characteristic of the two wheel brakes of a vehicle axle during a braking process. In this context, one must expect a quicker braking action at the wheel having the smaller clearance than at the wheel having a larger clearance. Accordingly, the clearance has a not inconsiderable influence on the comfort and safety during the braking process of a motor vehicle.

SUMMARY OF THE INVENTION

Therefore, an object of the present invention is to specify measures which make it possible to determine the release of a wheel brake, in particular, to adjust a predefined clearance at the wheel brake.

The following described design approach makes it possible to determine exactly and simply when the wheel brake has released, i.e., the wheel pads have lifted off from the disc or the drum, even when the sensors employed at the wheel brake exhibit drifts.

It is particularly advantageous that it allows a defined adjustment of a clearance after the termination of a braking. In so doing, appearances of drift in the sensor signals used for adjusting the clearance are taken into account. In this manner, a zero shift of the sensors used, e.g., of braking-force, braking-torque, and/or angular-position sensors, as the result of temperature influences, etc., are rectified, it being possible to always adjust the same clearance, irrespective of the respective zero shift.

Used in particularly advantageous manner to ascertain the clearance is not the absolute value of the braking-force or braking-torque sensor, but rather a relative value of such a sensor. From this relative value can be determined the offset of an angular-position sensor, according to whose signal the optimum clearance is adjusted.

The adjustment of the clearance is particularly accurate if the offset determination is repeated at brief time intervals, until the temperature equilibrium between the wheel brake and the ambient temperature has settled. Therefore, to adjust the clearance, in advantageous manner the brake pads are applied for a short period and released again outside of the braking process, as well.

Particularly advantageous, particularly because of low costs, is the determination of an angle in the region of a brake actuator having an electric motor, e.g., the rotational angle of the electric motor or a rotational angle of the gear output of the brake actuator using Hall-effect sensors which emit several pulses per revolution.

DETAILED DESCRIPTION

Figure 1:
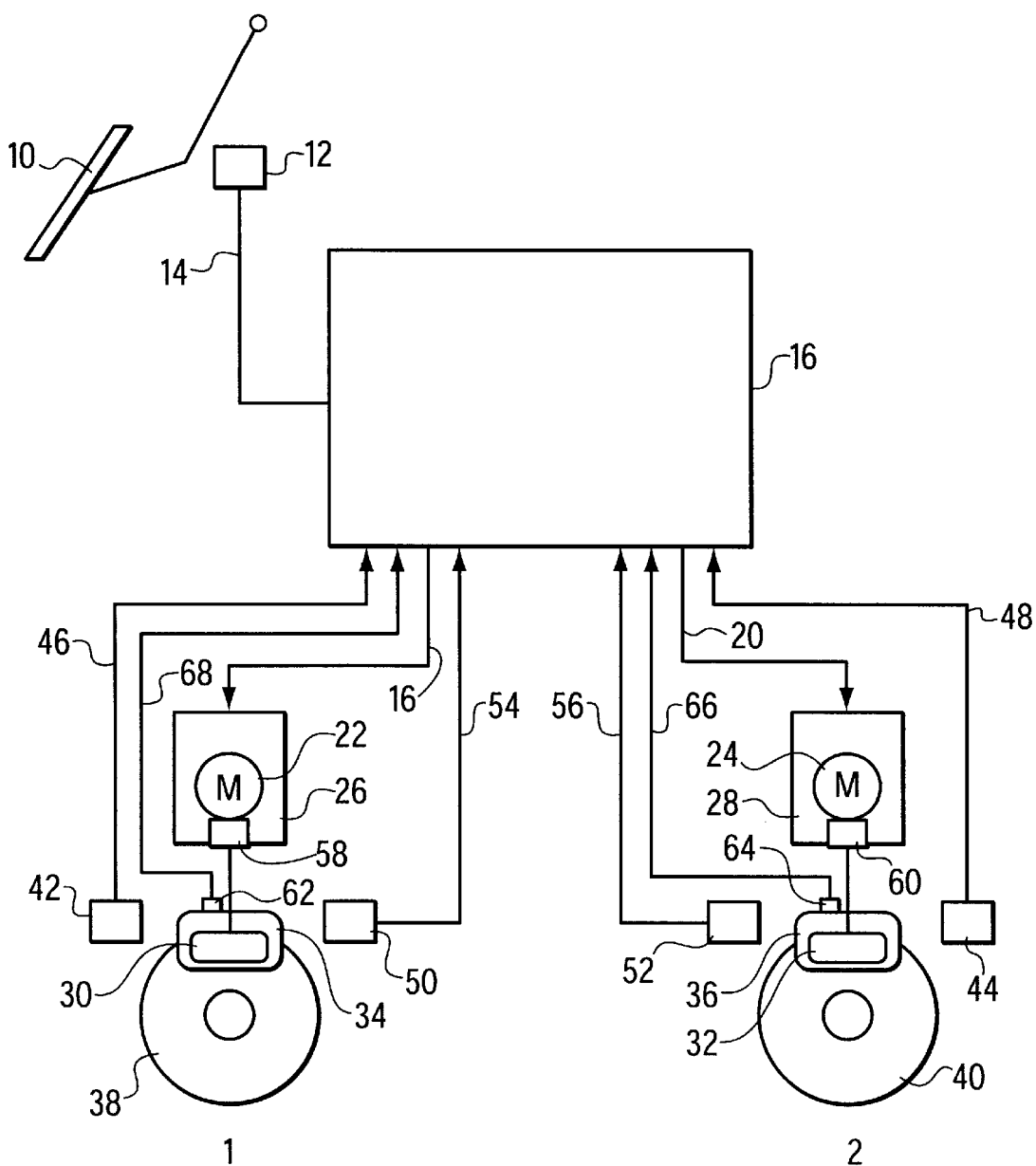
FIG. 1 shows a synoptic block diagram of a braking system having application of the brakes by an electric motor, using a wheel pair as an example.

FIG. 1 shows a synoptic block diagram of a braking system having application of the brakes by an electric motor, using a wheel pair as an example. This wheel pair could be allocated to one axle or to a diagonal of the vehicle. The vehicle brake pedal is represented by 10. The driver's braking input is detected using sensor system 12 by measuring the angle, path and/or force, and is fed via lines 14 to an electronic control system 16. In one advantageous layout, this control system 16 is composed of decentrally distributed control units. Sensor system 12, as well as, at least partially, electronic control system 16, are redundantly designed. The electronic control system 16 actuates electric motors 22 and 24 via output lines 16 and 20, for example, by a pulse-width-modulated voltage signal, using an H-bridge output stage. In one advantageous exemplary embodiment, commutator direct-current motors are used. The electric motors 22 and 24 are part of brake actuators 26 and 28. The rotatory movements of these motors 22 and 24 are converted in the downstream gear stages 58 and 60 into translatory movements which lead to displacements of brake pads 30 and 32. The brake pads 30 and 32 are guided in brake calipers 34 and 36 and act on brake discs 38 and 40 of wheels 1 and 2. Moreover, in one preferred exemplary embodiment, provision is made for an electrically operable spring-powered brake, with whose aid, the associated brake actuator 26, 28 can be retained in the prevailing position, so that the electric motor 22, 24 can be switched into the currentless state. The position of the brake actuator 26, 28 is then retained without energy consumption.

Employed at each wheel 1 and 2 are force or torque sensors 42 and 44, whose signals are fed to electronic control system 16 via measuring lines 46 and 48. In one design variant, the axial supporting forces of the actuators 26 and 28 during a braking process are measured by sensors 42 and 44, and thus form a measure for the normal forces acting on the brake discs 38 and 40. In the following, this variant is named force measurement. Therefore, the braking force is the force with which the brake shoes 30 and 32 press against the brake discs or drums 38 and 40. In another design variant, the tangential supporting forces of the brake pads 30 and 32 are measured, and thus form a measure for the friction forces or their friction moments occurring in the brake discs 38 and 40. This measurement—as well as the use of a direct torque sensor—is designated in the following as torque measurement. In addition, the wheel speeds are detected using sensors 50 and 52, and are transmitted to control system 16 via input lines 54 and 56. Provision is further made for angular-position sensors 62 and 64, whose signals are fed to control system 16 via lines 66 and 68. In one preferred exemplary embodiment, these angular-position sensors 62 and 64 are Hall-effect sensors which, for example, detect the revolution of the electric motor of the associated brake actuator 26, 28 and deliver several pulses per revolution, the number of pulses being a measure for the angle covered, and thus for the path covered. In other exemplary embodiments, other sensors (e.g. variable-inductance sensing elements, potentiometers, etc.) are used for measuring the path or angle.

Setpoint values for the individual wheel brakes or groups of wheel brakes are determined in electronic control system 16 from the detected braking input provided by the driver, in accordance with pre-programmed families of characteristics. For example, these setpoint values correspond to the braking torques or braking forces to be adjusted at a wheel or a wheel pair 1, 2, whose quantities are a function, inter alia, of the axle load distribution of the vehicle. From the ascertained, possibly wheel-individual setpoint values, system deviations are determined by comparison with the actual values of the braking forces or braking torques measured in sensors 42 and 44, the system deviations being fed to controller algorithms, for example, in the form of time-discrete PID controllers. The controlled variable of this controller is used to drive the electric motors 22 and 24, corresponding drive signals being output via lines 16 and 20. At the end of a braking process, in each case the reference input variables for the braking forces or the braking torques to be adjusted become zero. This is the instant for the beginning of the clearance adjustment, the actuator position being locked by driving the spring-powered brake after the conclusion of the clearance adjustment.

According to the following design approach, the clearance of a brake disc 38, 40 is adjusted utilizing the path or angle signal on the basis of the force signal or torque signal. In this context, the change tendency of the braking force or the braking torque over the path or angle is ascertained. If this change tendency is zero, then the brake pad is no longer contacting the brake disc 38, 40. The zero point or the offset value of the path or angle measurement and of the force or torque sensor 42, 44 is ascertained at this instant. This value is the starting point of the clearance adjustment by a closed-loop path or angle control to a pre-defined setpoint clearance calculated from the zero point.

For clarification, the problem in the use of force or torque sensors 42 and 44 is set forth in the following paragraphs with reference to FIGS. 2a through 2d. In so doing, braking force F or braking torque M is in each case plotted over the travel path of brake pads x.

Figure 2A:
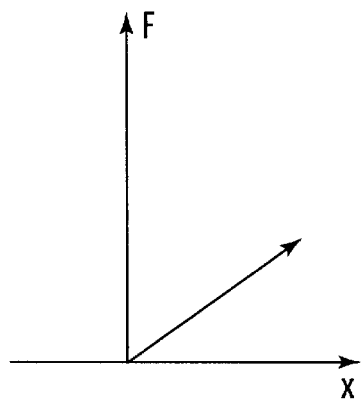
FIG. 2a shows a first graph illustrating the characteristics of one of the braking-force and braking-torque signal under a particular condition, as well as the advantageous effects of the following described design approach.

The situation shown in FIG. 2a corresponds to the situation at the beginning of a braking. The braking force is increased from the zero point (force zero, path zero) with increasing path. Correspondingly, the torque signal over the path behaves according to FIG. 2c.

Figure 2B:
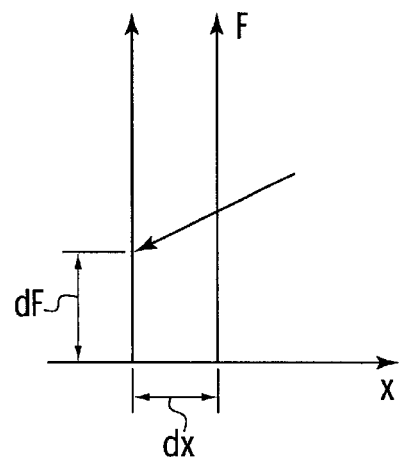
FIG. 2b shows a second graph illustrating the characteristics of one of the braking-force and braking-torque signal under a particular condition, as well as the advantageous effects of the following described design approach.
Figure 2C:
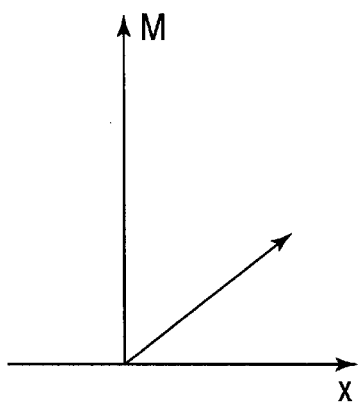
FIG. 2c shows a third graph illustrating the characteristics of one of the braking-force and braking-torque signal under a particular condition, as well as the advantageous effects of the following described design approach.
Figure 2D:
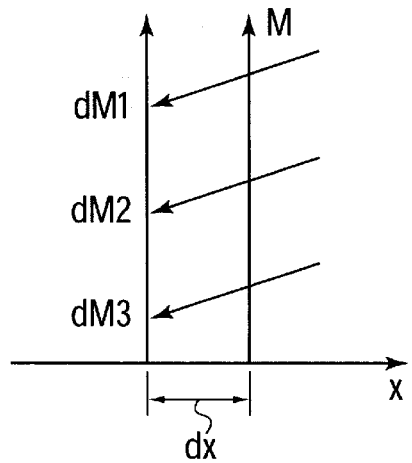
FIG. 2d shows a fourth graph illustrating the characteristics of one of the braking-force and braking-torque signal under a particular condition, as well as the advantageous effects of the following described design approach.

After a strong braking, the disc 38, 40 heats up and becomes thicker because of the thermal expansion. Therefore, a zero shift dx results in the path according to FIG. 2b. The new path zero point indicates the path which is necessary to lift the brake pads 30, 32 off from the brake discs 38, 40. In the same manner, the associated force sensors 42 and 44 heat up, which likewise leads to a corresponding zero shift dF as shown in FIG. 2b.

The same holds true for when sensors 42, 44 are embodied as torque sensors. The problem is the same as in the case of the force sensor described above, but it is even more intensified, because when the wheel is stationary, the torque sensor delivers a completely false signal. As above, in the case of the torque sensor 42, 44, shifts also occur which are designated in FIG. 2d by dx and dM3. If, given a wheel coming to a standstill, on the basis of the mechanical hysteresis, the residual torque in the brake shoe 30, 32 is dM1, if there would be no thermal expansion of the disc 38, 40. Due to the thermal expansion of the disc 38, 40, the sensor 42, 44 indicates dM3, although the residual torque of the hysteresis dM1 is in the brake shoe 30, 31. The situation is corresponding when the vehicle is on a downgrade. In this case, the sensor 42, 44 indicates the downgrade force dM2, although the residual torque of the hysteresis dM1 is in the brake shoe 30, 32.

In addition, neither the force sensor nor the torque sensor 42, 44 has an exactly reproducible characteristic curve, which likewise contributes to the zero shift. Particularly in the case of forward travel and reverse travel, great differences occur in the zero point. The result of this can be, for example, that on the basis of the force-sensor signal, the zero point is no longer reached after the braking, and residual forces are present in the wheel brake, which lead to heating and wear and tear.

Because of these conditions, an additional signal is used to exactly adjust the clearance, in order to unequivocally and reliably eliminate the residual forces.

Used as an additional signal is a path or angle signal, e.g., by detecting the angle of the electric motor 22, 24 of the actuator 26, 28 using Hall-effect sensors 62, 64 or other sensors. In so doing, first of all, the path which the brake pad 30, 32 covers can be measured; on the other hand, a corresponding signal can be determined from an angle measurement of the revolutions of the rotor of the electric motor 22, 24. In the preferred exemplary embodiment, this angle is measured by Hall-effect sensors 62, 64, and the path which the brake pad 30, 32 covers is calculated within the framework of the following equation:

$$x' = S*PHI/(I*2*3.14)$$

S signifies the rise of the actuator spindle,

I signifies the transmission ratio of the actuator gear,

PHI signifies the measured angle of the rotor of the motor, x' signifies the sought path of the brake shoe or of the brake pad.

Problematic in this case is that the same holds true for the path sensor 62, 64 as for the other sensors. It is likewise not free from faults, and can deliver a faulty signal after the braking because of temperature drift or due to missing pulses. This means that this sensor signal moves out of its zero point as well, and thus the adjustment of the clearance is not always exact on the basis of this signal alone.

Figure 2E:
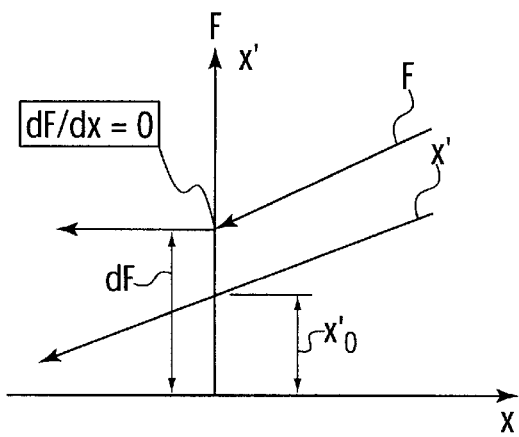
FIG. 2e shows a fifth graph illustrating the characteristics of one of the braking-force and braking-torque signal under a particular condition, as well as the advantageous effects of the following described design approach.

With the aid of FIG. 2e, in which measured force F or measured path x' is plotted over actual path x', a procedure is shown which, in spite of the drift-affected signals, makes it possible to compensate the residual forces and to adjust an exact clearance.

FIG. 2e shows the situation after a strong braking. It is assumed that the sensors 62, 64 have drifted away from their zero point in the manner indicated, i.e., the path sensor 62, 64 exhibits an offset x'0, the force sensor 42, 44 exhibits an offset dF. The characteristic of this situation is that the force sensor 42, 44 no longer changes its signal in the zero point when the brake shoe 30, 32 lifts off from the disc 38, 40. The corresponding holds true as well for a torque sensor 42, 44, given a rotating wheel 1, 2. Therefore, in response to the brake pad 30, 32 lifting off from the disc 38, 40, the change of the force over the path is zero, i.e., the quotient dF/dx'=0. The change tendency of this quotient is monitored, and the zero point is assumed when this change tendency becomes zero. In this context, it is advantageous that not the absolute value of the force sensor 42, 44, but rather merely its relative change plays the dominating role for recognizing the zero point. If the quotient becomes zero, the offset x'0 of the path sensor 62, 64 is determined at this point. The path measurement is again correct on the basis of this measured offset value, so that the brake pad 30, 32 can be run into the pre-defined clearance. In this process, the clearance is pre-defined by a specific path from the zero point away from the brake disc 38, 40. The described process must be repeated at brief time intervals until the temperature equilibrium at the wheel brake has settled at the ambient temperature. The clearance is then adjusted in such a way that the residual forces are completely reduced and the wear and tear of the brake pad 30, 32 is compensated. In one preferred exemplary embodiment, the clearance is adjusted within the framework of a closed-loop position or angle control of the electric motor 22, 24.

The corresponding procedure is selected in connection with a torque measurement. However, in this case it is necessary to take into account that sensor 42, 44, when serving as a torque sensor, only emits a signal when the wheel 1, 2 is moving. Therefore, the most unfavorable case must generally be assumed, namely, the case where the maximum residual torque is retained in the brake caliper 34, 36 because of the friction, while the wheel 1 and 2 is at standstill on a level. Therefore, in the procedure in connection with a torque measurement, the brake shoe 30, 32 is initially run by the path sensor 62, 64 into the predefined zero point. This is not exact, so that a slight residual torque can be retained. The correct adjustment of the clearance is effected when the wheel 1, 2 is rotating, and proceeds according to the procedure presented above.

To exactly adjust the clearance, the brake pads 30, 32, outside of the braking process, are applied for a brief period repeatedly if necessary within the framework of an adjustment operation, in order to ascertain the zero point according to the procedure presented above.

Figure 3:
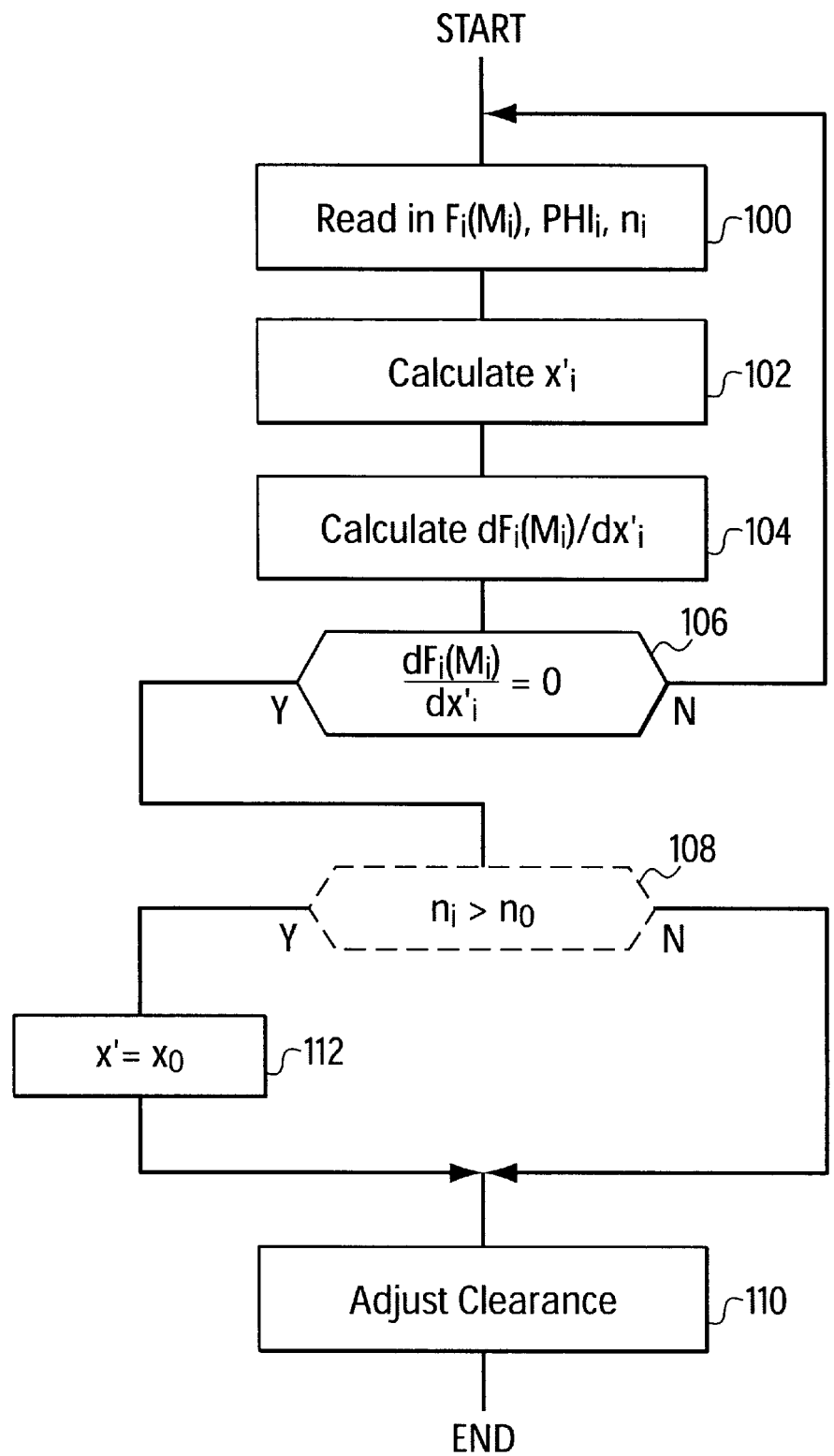
FIG. 3 shows the framework of a computer program implementing the design approach described.

This procedure is implemented within the framework of a computer program whose basic structure is sketched within the framework of the flow chart according to FIG. 3.

The program sketched in FIG. 3 is carried out at the end of each braking process, be it a braking desired by the driver, or be it after an application of the pads 30, 32 specially started to ascertain the zero point. In the first step 100, the variables existing for each wheel i(i=1, 2, 3, 4) are read in, i.e., measured force Fi or measured torque Mi, measured angle PHIi, as well as the respective rotational frequency ni. Thereupon, in step 102, path x'i is calculated from the respective angle signal PHIi according to the above formula. In the following step 104, change tendency dFi/dx'i or dMi/dx'i is calculated. In each case, this is done by taking into account two successive values of the force, of the torque or of the path. In step 106, it is checked whether the change tendency calculated in step 104 is zero (taking into consideration any tolerances). If this is not the case, the program is repeated with step 100 and the change tendency is ascertained for the next run. If step 106 has revealed that the change tendency is zero, then, given the use of a torque sensor, it is checked in step 108 whether rotational frequency ni is greater than rotational frequency n0, below which a standstill of the wheel 1, 2 must be assumed. If this is not the case, according to step 110, the clearance is adjusted within the framework of a closed-loop position control on a basis of a predefined value for clearance, as well as possibly a stored predefined offset value x0. If the wheel 1, 2 is rotating or if a force sensor 42, 44 is used, then in step 112, measured path x' which exists when the change tendency according to step 106 becomes zero, is stored as offset value x0 of the angular-position sensor. Thereupon, according to step 110, the clearance is adjusted according to the above description, taking into consideration the newly ascertained value x0. After step 110, the program is terminated and is started again in response to the next braking or in response to the next test movement to ascertain the zero point.

The test movement lies in the fact that first of all, the brake pads 30, 32 are somewhat applied, and thereupon the brake is released in order to determine the exact zero point. As described above, such a test movement is repeated at brief time intervals until a temperature equilibrium has settled in, i.e., particularly until the ascertained offset value no longer changes substantially.

In this manner, an exact adjustment of the clearance results, with the advantages indicated at the outset. Besides the use for an electro-mechanical brake, this procedure can also be used to adjust the clearance in other braking systems, e.g., for electro-hydraulic or electro-pneumatic brakes which are provided with the appropriate sensors.

What is claimed is:

1. A method for controlling a wheel brake provided with an electrically controllable control device according to a control arrangement, comprising the steps of:

forming a driving signal for controlling the wheel brake;

supplying the driving signal to the control device;

ascertaining one of a braking force and a braking torque at the wheel brake;

ascertaining a measure of a path covered by a brake pad of the wheel brake; and controlling the wheel brake on the basis of a change tendency of one of a force signal and a torque signal over the path.

2. The method according to claim 1, further comprising the step of:

performing a clearance adjustment for a clearance of the wheel brake on the basis of one of the force signal and the torque signal and on the basis of the change tendency of one of the force signal and the torque signal over the path.

3. The method according to claim 2, further comprising the steps of:

forming a quotient with respect to one of a change in the force signal and a change in the torque signal, and with respect to a change of a path signal; and ascertaining a zero point for the clearance adjustment, the zero point being recognized when the quotient has a value of about zero.

4. The method according to claim 3, wherein the step of performing the clearance adjustment includes the step of:

adjusting the clearance in proportion to the path on the basis of the ascertained zero point.

5. The method according to claim 3, wherein the step of ascertaining the zero point includes the steps of:

providing a torque sensor, and ascertaining the zero point only when a wheel associated with the wheel brake is rotating.

6. The method according to claim 3, further comprising the step of:

repeating the step of ascertaining the zero point at brief time intervals until a temperature equilibrium at the wheel brake has settled at an ambient temperature.

7. The method according to claim 3, wherein, when a torque sensor is used to adjust the clearance, the method comprises the steps of:

initially adjusting the clearance as a function of the measure of the path; and after initially adjusting the clearance, performing the step of ascertaining the zero point.

8. The method according to claim 1, wherein the step of ascertaining the measure of the path includes the steps of:

measuring an angle of a rotor of an electric motor associated with the wheel brake, and deriving the measure of the path from the measured angle.

9. The method according to claim 1, wherein the step of ascertaining the measure of the path includes the steps of:

measuring a movement angle in accordance with an operation of a Hall-effect sensor, and ascertaining the measure of the path from the measured movement angle.

10. The method according to claim 3, wherein the zero point is the instant at which one of a brake shoe and a brake pad of the wheel brake lifts off from one of a brake disc and a brake drum of the wheel brake.

11. The method according to claim 3, wherein the clearance is formed during a closed-loop position control on the basis of the path signal, a predefined clearance path, and an ascertained offset value.

12. A device for controlling a wheel brake according to a control arrangement, comprising:

an electrically controllable control device;

a control unit for forming a driving signal for controlling the wheel brake and for providing the drive signal to the control device;

one of a force sensor and torque sensor provided at a wheel associated with the wheel brake and in communication with the control unit, the one of the force sensor and the torque sensor ascertaining one of a braking force and a braking torque at the wheel brake; and a path sensor provided at the wheel and in communication with the control unit, the path sensor ascertaining a measure for a path covered by a brake pad of the wheel brake, wherein the control unit includes a control arrangement for controlling the wheel brake on the basis of a change tendency of one of a force signal and a torque signal over the path.

* * * * *